United States Patent
Giertz

(10) Patent No.: US 8,950,203 B2
(45) Date of Patent: Feb. 10, 2015

(54) HEAT PUMP DEVICE

(75) Inventor: Björn Giertz, Bromma (SE)

(73) Assignee: Scandinavian Energy Efficiency Co. Seec AB, Saltsjo-Duvnas (SE)

( * ) Notice: Subject to any disclaimer, the term of this patent is extended or adjusted under 35 U.S.C. 154(b) by 681 days.

(21) Appl. No.: 12/681,626

(22) PCT Filed: Oct. 7, 2008

(86) PCT No.: PCT/SE2008/051136
§ 371 (c)(1),
(2), (4) Date: Jun. 24, 2010

(87) PCT Pub. No.: WO2009/048416
PCT Pub. Date: Apr. 16, 2009

(65) Prior Publication Data
US 2010/0281907 A1    Nov. 11, 2010

(30) Foreign Application Priority Data
Oct. 12, 2007 (SE) ................................. 0702290

(51) Int. Cl.
*F25B 13/00*    (2006.01)
*F25D 23/12*    (2006.01)
(Continued)

(52) U.S. Cl.
CPC ............... *F25B 25/005* (2013.01); *F25B 13/00* (2013.01); *F25B 30/06* (2013.01); *F25B 47/006* (2013.01); *F24D 11/0214* (2013.01); *F24D 19/1039* (2013.01); *F24D 3/082* (2013.01);
(Continued)

(58) Field of Classification Search
USPC ............ 62/324.1, 324.2, 159, 160, 260, 332, 62/333
See application file for complete search history.

(56) References Cited

U.S. PATENT DOCUMENTS

2003/0070436 A1 *  4/2003  Wood et al. ..................... 62/114
2003/0159449 A1 *  8/2003  Takano et al. ................... 62/174
(Continued)

FOREIGN PATENT DOCUMENTS

DE    201 02 546 U1    5/2001
EP    1780476 A1 *    5/2007
(Continued)

OTHER PUBLICATIONS

International Search Report, dated Jan. 19, 2009, from corresponding PCT application.
(Continued)

*Primary Examiner* — Judy Swann
*Assistant Examiner* — Zachary R Anderegg
(74) *Attorney, Agent, or Firm* — Young & Thomspon

(57) ABSTRACT

A device for heating and cooling, respectively, includes a heat pump (1), a first heat exchanger (2) arranged at a first side of the heat pump (1), which first heat exchanger (2) is thermally connected to a first heat carrier being circulated in a first loop (10), and a second heat exchanger (3) arranged at a second side of the heat pump (1), which second heat exchanger (3) is arranged to transfer thermal energy to or from a second heat carrier which is circulated in a second loop (20). The first (10) and the second (20) loops are interconnected by a conduit (4) so that the first loop (10), the second loop (20) and the conduit (4) together form a connected system, in which connected system one and the same heat carrier is arranged.

20 Claims, 1 Drawing Sheet

(51) Int. Cl.
*F25B 25/00* (2006.01)
*F25B 30/06* (2006.01)
*F25B 47/00* (2006.01)
*F24D 11/02* (2006.01)
*F24D 19/10* (2006.01)
*F24D 3/08* (2006.01)
*F24D 19/00* (2006.01)

(52) U.S. Cl.
CPC ........ *F24D19/0095* (2013.01); *F24D 2200/11* (2013.01); *F24D 2200/12* (2013.01); *F25B 2339/047* (2013.01); *Y02B 10/40* (2013.01)
USPC ............................... 62/160; 62/260; 62/324.2

(56) References Cited

U.S. PATENT DOCUMENTS

| | | | |
|---|---|---|---|
| 2004/0025526 A1* | 2/2004 | Aflekt et al. | 62/324.1 |
| 2006/0196958 A1* | 9/2006 | Dancey et al. | 237/67 |
| 2010/0064709 A1 | 3/2010 | Giertz et al. | |

FOREIGN PATENT DOCUMENTS

| | | |
|---|---|---|
| FR | 2 802 621 A1 | 6/2001 |
| JP | 57-062027 U | 4/1982 |
| JP | 58-165564 U | 11/1983 |
| JP | 61-11567 A | 1/1986 |
| JP | 2003-050035 A | 2/2003 |
| JP | 2006-226618 A | 8/2006 |
| JP | 2006-250497 A | 9/2006 |
| SE | 0602688 L | 6/2008 |
| WO | 03/069240 A1 | 8/2003 |

OTHER PUBLICATIONS

Japanese Office Action, dated Jan. 4, 2013, from corresponding Japanese Office Action.

Renedo et al., "Optimum design for reversible water-water heat pumps", Energy and Buildings, 2006, vol. 38, pp. 1240-1247.

* cited by examiner

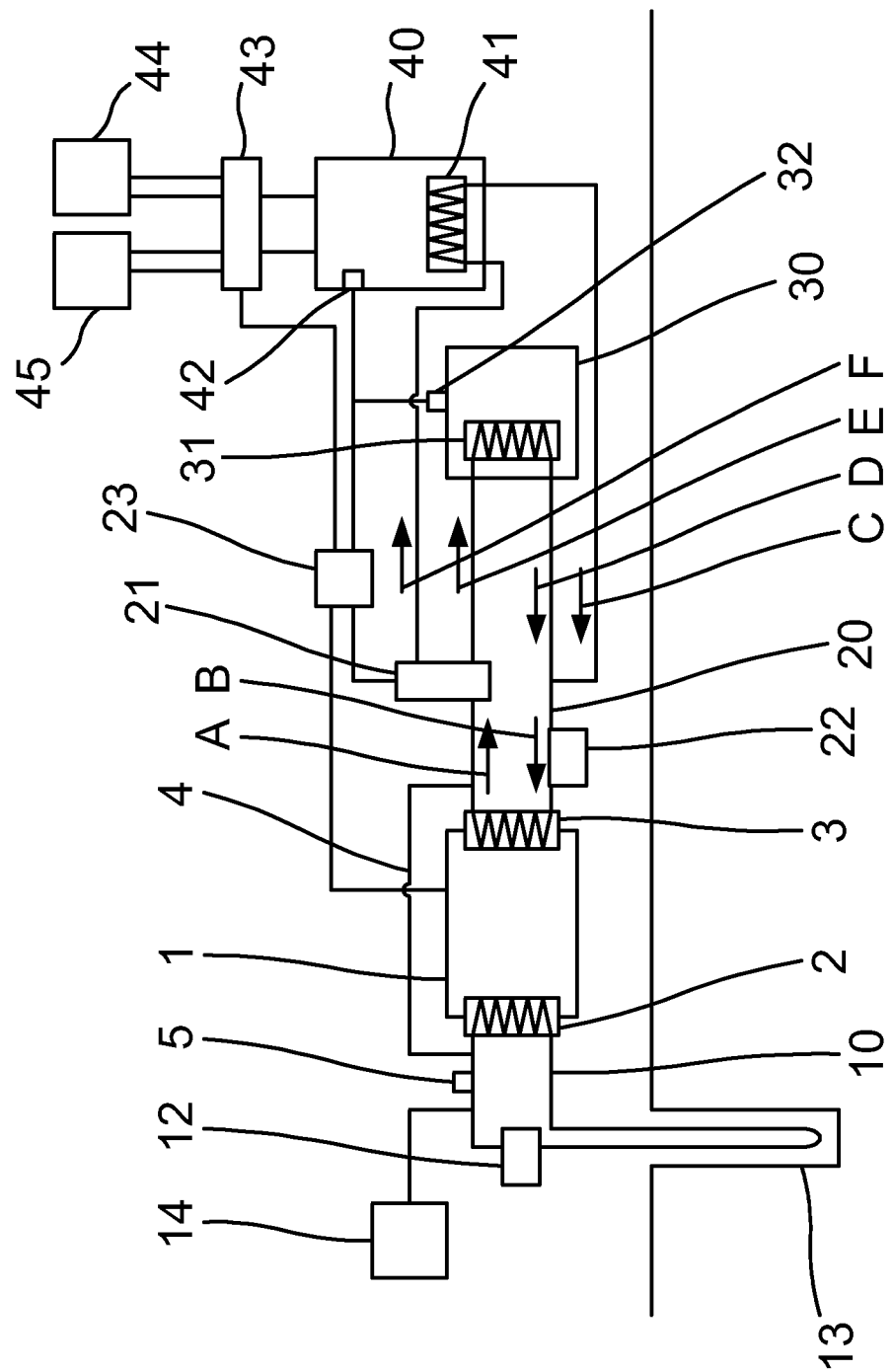

HEAT PUMP DEVICE

BACKGROUNG OF THE INVENTION

1. Field of the Invention

The present invention relates to a device for heating and cooling, respectively. More specifically, the invention relates to such a device comprising a heat pump.

2. Description of the Related Art

Heat pumps are frequently used for heating and/or cooling. Such a heat pump has two sides, a warm side and a cold side. In so-called reversible heat pumps, the two sides can change sides, so that the warm side becomes cold and vice versa. This is useful in case the heat pump will be operated both for heating and cooling but at different times.

In a closed system, between the two sides in such a heat pump, a cooling medium flows. Each side is thermally connected, via a respective heat exchanger, to an outer loop, through which outer loop a heat carrier flows, respectively. The term "heat carrier" is herein used for a liquid with the ability to transfer thermal energy from one place to another when transported between the two places. In other words, the heat carrier may carry either heat or coldness. In one example of such a system, the first outer loop consists of a drilled hole for geothermal heating, and it is thermally connected to the cold side of the heat pump. A second outer loop consists of a heating system for use in for instance a building, and is thermally connected to the warm side of the heat pump.

In such systems, there are thus at least two separate loops present, which among other things each require one refilling means and one expansion tank. Hence, a large number of components are needed to manufacture such systems. This leads to increased costs in terms of unnecessarily poor production reliability as well as unnecessarily high demands on maintenance. Moreover, operation surveillance is made more difficult, because a separate pressure sensor is required in each separate loop. On top of this, system startup becomes complicated, since heat carrier must be filled at several different places.

In conventional systems for heating and cooling of a property, there is often a freeze risk in the loop which is connected to the cold side of the heat pump during cooling operation, since the cooling medium in the property is kept at comparatively low temperatures and is cooled further when coming into contact with the heat exchanger against the cold side of the heat pump, and since this cooling medium is often comprised of water with no added anti-freeze agent.

Furthermore, when the heat pump is in operation, the outer loop, which receives thermal energy from the heat exchanger, must in such systems always be operated with a constant flow of the heat carrier in order to avoid damages in the heat exchanger due to exaggerated heating. This is a problem since systems for heating, for instance, indoor air in a building normally are connected to one or more temperature regulators, which switch off the outer thermal energy absorbing loop when a desired air temperature is reached. Hereby, the heat pump must also be switched off in order not to be damaged, leading to decreased total system efficiency. Also, repeated switching on and off increases the wear on the heat pump.

SUMMARY OF THE INVENTION

The present invention solves the above described problems.

Thus, the invention relates to a device for heating and cooling, respectively, comprising a heat pump, a first heat exchanger arranged at a first side of the heat pump, which first heat exchanger is thermally connected to a first heat carrier being circulated in a first loop, and a second heat exchanger arranged at a second side of the heat pump, which second heat exchanger is arranged to transfer thermal energy to or from a second heat carrier which is circulated in a second loop, and is characterised in that the first and the second loops are interconnected by a conduit so that the first loop, the second loop and the conduit together form a connected system, in which connected system one and the same heat carrier is arranged.

BRIEF DESCRIPTION OF THE DRAWING FIGURE

In the following, the invention will be described in closer detail, with reference to exemplifying embodiments of the invention and to the appended drawings, in which:

FIG. 1 is a principal overview of a device according to the present invention.

DETAILED DESCRIPTION OF THE INVENTION

A heat pump 1 comprises two sides, one warm and one cold. On either side, there is arranged a first 2 and a second 3 heat exchanger, respectively. The heat pump 1 is of the type liquid-liquid, meaning that it is arranged to transfer thermal energy between two liquid heat carriers.

According to a preferred embodiment, the heat pump 1 is reversible, meaning that the heat pump 1 may be used both for heating and cooling. Depending on which mode of operation is chosen, either one of the sides may be the cold side. During heating operation, the side of the first heat exchanger 2 is the cold side and the side of the second heat exchanger 3 is the warm side, and the other way around during cooling operation.

In other words, the heat pump 1 is arranged to be able to transfer thermal energy both from the side of the first heat exchanger 2 to the side of the second heat exchanger 3 and the other way around. In order to achieve good installation, operation, and maintenance economy for such a heat pump, it is preferred that the first heat exchanger 2 is arranged with the same capacity as the second heat exchanger 3. Such a heat pump arrangement is previously known from the Swedish patent with number 0602688-4, which is hereby incorporated herein in its entirety by reference.

The first heat exchanger 2 is thermally connected to a first loop 10, in the form of a piping work. In the first loop 10, a heat carrier is circulated by use of a pump device 12 which is known per se.

According to a preferred embodiment, the first loop 10 conveys the heat carrier down into and up from an energy well 13. It is realised that the energy well 13 may take many different forms, such as a loop buried in the ground or underwater in a lake, or in the form of a dug or drilled hole in the ground. When the energy well 13 is warmer than the side of the first heat exchanger 2 of the heat pump 1, the heat carrier thus transfers thermal energy from the energy well 13 to the heat pump 1 by being circulated in the first loop 10 by the use of the pump device 12. Correspondingly, the heat carrier transfers thermal energy from the heat pump 1 to the energy well 13 in case the energy well 13 is cooler than the side of the first heat exchanger 2 of the heat pump 1.

Moreover, the second heat exchanger 3 is thermally connected to a second loop 20, in the form of a pipe work. A second pump device 22, known per se, is arranged to circulate a heat carrier in the second loop 20.

When the heat carrier 1 is set to heating operation, i.e. to transfer thermal energy from the first heat exchanger 2 to the second heat exchanger 3, thermal energy is transferred from the energy well 13 to the first heat exchanger 2, and through heat pump action on to the second heat exchanger 3 and further on to the heat carrier in the second loop 20. In this case, the added thermal energy may be used for heating of a building (not shown), such as heating of tap water and/or of indoor air.

When, on the other hand, the heat pump 1 is set to cooling operation, i.e. to transfer thermal energy from the heat carrier in the second loop 20, via the heat pump 1 and the heat carrier in the first loop 10 to the energy well 13, the cooled heat carrier may be used for cooling the building, such as cooling of indoor air.

The second loop 20 comprises a first 31 and a second 41 additional heat exchanger. The first additional heat exchanger 31 is thermally connected to a hot-water tank 30 for tap water. The second additional heat exchanger 41 is thermally connected to an energy buffer device 40, comprising a tank with a heat carrier. The volume of the tank has sufficient dimensions for buffering thermal energy in an adequate manner in the actual application. The heat carrier in the buffer device 40 may, for example, be water.

Since the second pump device 22 is arranged to circulate the second heat carrier in the second loop 20, thermal energy may thus be transferred through the second loop 20 between, on the one hand, the heat pump 1 and, on the other hand, the additional heat exchangers 31, 41.

During operation, the heat carrier in the second loop 20 is circulated according to the arrows A, B. Moreover, a control device 23 controls a valve arrangement 21, so that the flow of heat carrier in the second loop 20 is either controlled according to the arrows F, C, whereby the heat carrier is directed to the second additional heat exchanger 41, or according to the arrows D, E, whereby the heat carrier is directed to the first additional heat exchanger 31. The valve arrangement 21 may, for example, be comprised of a conventional, adjustable three-way valve.

The control device 23 controls the valve arrangement 21 on the basis of on the one hand if the heat pump 1 is being operated in heating mode or in cooling mode, and on the other hand depending on if a temperature regulator or temperature sensor 42, arranged in the heat buffer device 40 and connected to the control device 23, indicates that the temperature in the heat buffer device 40 exceeds a predetermined value.

According to a preferred embodiment, when the heat pump 1 is operated in heating mode, i.e. when it transfers thermal energy from the first loop 10 to the second loop 20, the heat carrier is directed primarily to the second heat exchanger 41. When the temperature regulator 42, which continuously surveils the temperature in the energy buffer device 40, measures a temperature which exceeds a predetermined value, the temperature regulator 42 emits a signal to the control device 23, which in turn controls the valve arrangement 21 to direct the heat carrier to the first heat exchanger 31 instead. The predetermined value may be set during manufacture or installation, or be adjustable. Thus, during heating operation thermal energy is transferred to the energy buffer device 40 as long as its temperature is at least as low as the predetermined value. Otherwise, the thermal energy is transferred from the heat pump 1 to the hot-water tank 30, which thereby also serves as an energy buffer. The hot-water tank 30 also comprises a temperature regulator 32, which in a corresponding manner as for the temperature regulator 42 emits a signal to the control device 23 when the temperature in the hot-water tank 30 exceeds a certain predetermined value. When this happens, the control device 23 may temporarily set the system to a switched-off state.

This arrangement makes it possible for the heat pump 1 to be operated with essentially less frequently occurring on- and off switching in comparison to conventional systems during heating operation, despite that the temperature regulator 42 is used to keep an even temperature level in the energy buffer device 40. Thereby, the problems are reduced with respect to overheating and wear in the heat pump 1, which can be operated more smoothly, something which also leads to high total efficiency for the system. Since the heat pump 1 does not have to be set off and on in order to adjust the heat yield during operation, a smoother operation of the system is also achieved.

On the other hand, when the heat pump 1 is operated in cooling mode, i.e. when it transfers thermal energy from the second loop 20 to the first loop 10, the heat carrier is always directed to the second heat exchanger 41. Thus, in this case the heat carrier transfers thermal energy from the energy buffer device 40 to the heat pump 1, whereby the energy buffer device 40 is cooled.

A thermal coupling device 43 is connected to the energy buffer device 40, and is controlled by the control device 23. For example, this thermal coupling device 43 may be comprised of a suitable, conventional, closed system of pipe work and heat exchangers in which a heat carrier is circulated using a pump device (not shown), and is arranged to optionally transfer thermal energy between on the one hand the energy buffer device 40 and on the other hand either a first distribution system 44 for heat or a second distribution system 45 for coldness.

The first distribution system 44 may, for example, be a liquid based system for the distribution of heat to rooms in a building, such as a system with water filled radiators or waterborne underfloor heating, but may also be a system that transfers heat by the use of fan coil units.

The second distribution system 45 may, in a similar manner, be a liquid based system for the distribution of coldness to a building.

Thus, during heating operation the heat pump 1 will deliver thermal energy to both the hot-water tank 30, from which for example tap water for household use in a property may be taken, and to the energy buffer device 40. In this case, the control device 23 controls the thermal coupling device 43 to distribute thermal energy from the energy buffer device 40 to the first distribution system 44 for heat, so that the building thereby is heated. Thermal energy which is not needed for heating the building will, because of the temperature regulation, be directed to the hot-water tank 30.

During cooling operation, the heat pump 1 will absorb thermal energy from the energy buffer device 40 so that the heat carrier therein is cooled. In this case, the control device 23 controls the thermal coupling device 43 to let the second distribution system 45 for coldness absorb thermal energy from the property and transfer device 40 for further transport to the heat pump 1.

In case cooling of the building is desired at the same time as heating of tap water, it is of course possible to let the heat pump 1 alternate between heating and cooling operation, whereby thermal energy alternately is transferred from the heat pump 1 to the hot-water tank 30 and from the energy buffer device 40 to the heat pump 1.

According to a preferred embodiment, both distribution systems 44, 45 are of low temperature type. This means that the temperature difference, both during heating and cooling, between on the one hand the air being heated or cooled and on the other hand the heat carrier in the active distribution system for heat and coldness, respectively, is low. Furthermore, in those climatic zones mentioned above, this means that the temperature difference between on the one hand the energy buffer device 40, and thereby the second loop 20, and on the other hand the first loop 10, is low, which in turn leads to the fact that the efficiency of the heat pump 1 is high.

It is preferred that the temperature differences between the loop 10 and the loop 20 is as low as possible, since this leads to better efficiency both during heating and cooling.

As is shown in FIG. 1, the first loop 10 is connected to the second loop 20 by the use of a conduit 4. Thereby, a connected system which is comprised of the first loop 10, the second loop 20 and the conduit 4, is formed, with the conduit as a bridge therebetween. In this system, there is thus arranged only one and common heat carrier. The common heat carrier may be of any suitable type, such as for example water with a conventional anti-freezing additive.

The inner diameter of the conduit 4 is small in comparison to its length. More specifically, the diameter is so small that circulation of heat carrier between the first loop 10 and the second loop 20 is essentially hindered when the first loop 10, as well as the second loop 20, are filled with heat carrier to a level above that of the conduit 4. In other words, essentially no heat carrier flows from the first loop 10 to the second loop 20 or vice versa. The term "essentially no heat carrier" herein means that a small amount of heat carrier may flow between the two loops 10, 20, respectively, in connection to relative pressure changes as consequence of heating and/or cooling of the heat carrier present in the loops 10, 20, but that otherwise only amounts of heat carrier that are negligable for the operation of the system flow between the loops 10, 20 during operation.

According to a preferred embodiement, the conduit is at least 50 cm long and its inner diameter is maximally 10 mm.

The conduit 4 has a pressure equalizing influence between the first loop 10 and the second loop 20. This leads to the advantage that only one expansion tank 14 is required for the operation of both loops 10, 20, which implies a simplification in comparison to similar, known systems.

Moreover, as a consequence of this arrangement only one refilling device 5 is required for filling the loops 10, 20 with heat carrier. It is preferred that this refilling device 5, which is known per se, is arranged along the loop 10, and through it heat carrier may be filled simultaneously to the first loop 10 and thereby also, via the conduit 4, to the second loop 20. This also implies a simplification in comparison to similar, known systems, but also that the filling procedure may be carried out quicker.

For venting of the system, there is at least one ventilating valve (not shown) arranged. Depending on the current application, ventilating valves may also be arranged both in the first loop 10 and in the second loop 20.

For surveillance of the loops 10, 20 only one pressure sensor is required, since essentially the same pressure prevails in both loops 10, 20.

Finally, the above described arrangement with a connecting conduit 4 solves the problem of freezing risk in the second loop 20, since the same heat carrier is used as in the first loop 10. Thus, because the heat carrier used in the first loop 10 must be freeze resistant, the same also applies to the heat carrier in the second loop 20, why no freeze risk will be present in the second loop 20 during cooling operation. It is preferred that the common heat carrier is freeze resistant down to at least −10° C. For example, it may be comprised of water with 30% ethyl alcohol.

Above, preferred embodiments have been described. However, it is apparent to the skilled person that many modifications may be made to the described embodiments without departing from the idea of the invention. Thus, the invention shall not be limited to the described embodiments, but rather be variable within the scope of the attached claims.

The invention claimed is:

1. A heat pump device for heating and cooling, comprising: a reversible heat pump, the reversible heat pump being arranged for transfer of thermal energy both from a first side of the heat pump to a second side of the heat pump and from the second side to the first side; a first heat exchanger arranged at the first side of the heat pump, the first heat exchanger being thermally connected to a first heat carrier being circulated in a first loop; a second heat exchanger arranged at the second side of the heat pump, the second heat exchanger being arranged to transfer thermal energy to or from a second heat carrier which is circulated in a second loop; a conduit that interconnects the first and the second loops so that the first loop, the second loop and the conduit together form a connected system; and one and the same heat carrier is arranged in the connected system, wherein the conduit is at least 50 cm long and the conduit has an inner diameter that is maximally 10 mm such that there is general pressure equalization and essentially no heat carrier flows from the first loop to the second loop, and the heat carrier can flow either way in the conduit.

2. A heat pump device for heating and cooling, comprising: a reversible heat pump, the reversible heat pump being arranged for transfer of thermal energy both from a first side of the heat pump to a second side of the heat pump and from the second side to the first side; a first heat exchanger arranged at the first side of the heat pump, the first heat exchanger being thermally connected to a first heat carrier being circulated in a first loop; a second heat exchanger arranged at the second side of the heat pump, the second heat exchanger being arranged to transfer thermal energy to or from a second heat carrier which is circulated in a second loop; a conduit that interconnects the first and the second loops so that the first loop, the second loop and the conduit together form a connected system; and one and the same heat carrier is arranged in the connected system, wherein the conduit has dimensions such that there is pressure equalization and essentially negligible flow of heat carrier fluid from the first loop to the second loop, and the heat carrier can flow either way in the conduit.

3. The heat pump device according to claim 1, wherein the first heat exchanger has the same capacity as the second heat exchanger.

4. The heat pump device according to claim 1, wherein the first loop is arranged for transfer of thermal energy between on one side of the first loop an energy well and on the other side of the first loop a heat pump by means of a first pump device, arranged to circulate the first heat carrier in the first loop.

5. The heat pump device according to claim 1, wherein the second loop comprises at least one additional heat exchanger, whereby the second loop is arranged for transfer of thermal energy between on one side of the second loop the heat pump and on the other side of the second loop the additional heat exchanger by utilizing a second pump device arranged to circulate the second heat carrier in the second loop.

6. The heat pump device according to claim 5, wherein the second loop comprises a first additional heat exchanger which is thermally connected to a hot-water tank, a second additional heat exchanger which is thermally connected to an energy buffer device and a valve arrangement, in that a control device is arranged to control the valve arrangement so that the heat carrier either is directed to the first additional heat exchanger or to the second additional heat exchanger when the heat pump is set to transfer thermal energy from a first side to a second side of the heat pump, and in that the control device is arranged to control the valve arrangement so that the heat carrier is directed to the second additional heat exchanger when the heat pump is set to transfer thermal energy from its second side to its first side.

7. The heat pump device according to claim 6, wherein a thermal coupling device is arranged to transfer thermal energy from the energy buffer device to a first distribution system for heat when the device is set to heating mode operation, and in that the thermal coupling device is arranged to transfer thermal energy from a second distribution system for coldness to the energy buffer device when the device is set to cooling mode operation.

8. The heat pump device according to claim 1, wherein the first loop and the second loop together only comprise a single expansion tank.

9. The heat pump device according to claim 1, wherein the first loop is arranged with a refilling device, arranged to allow simultaneous filling of heat carrier to both the first loop and to the second loop.

10. The heat pump device according to claim 1, wherein the heat carrier is freeze resistant down to at least −10° C.

11. The heat pump device according to claim 1, wherein the heat carrier comprises water with 30% ethyl alcohol.

12. The heat pump device according to claim 1, wherein the conduit is at least 50 cm long and the conduit has an inner diameter that is maximally 10 mm.

13. The heat pump device according to claim 2, wherein the first heat exchanger has the same capacity as the second heat exchanger.

14. The heat pump device according to claim 2, wherein the first loop is arranged for transfer of thermal energy between on one side of the first loop an energy well and on the other side of the first loop a heat pump by means of a first pump device, arranged to circulate the first heat carrier in the first loop.

15. The heat pump device according to claim 2, wherein the second loop comprises at least one additional heat exchanger, whereby the second loop is arranged for transfer of thermal energy between on one side of the second loop the heat pump and on the other side of the second loop the additional heat exchanger by utilizing a second pump device arranged to circulate the second heat carrier in the second loop.

16. The heat pump device according to claim 2, wherein the second loop comprises a first additional heat exchanger which is thermally connected to a hot-water tank, a second additional heat exchanger which is thermally connected to an energy buffer device and a valve arrangement, in that a control device is arranged to control the valve arrangement so that the heat carrier either is directed to the first additional heat exchanger or to the second additional heat exchanger when the heat pump is set to transfer thermal energy from a first side to a second side of the heat pump, and in that the control device is arranged to control the valve arrangement so that the heat carrier is directed to the second additional heat exchanger when the heat pump is set to transfer thermal energy from its second side to its first side.

17. The heat pump device according to claim 16, wherein a thermal coupling device is arranged to transfer thermal energy from the energy buffer device to a first distribution system for heat when the device is set to heating mode operation, and in that the thermal coupling device is arranged to transfer thermal energy from a second distribution system for coldness to the energy buffer device when the device is set to cooling mode operation.

18. The heat pump device according to claim 2, wherein the first loop and the second loop together only comprise a single expansion tank.

19. The heat pump device according to claim 2, wherein the first loop is arranged with a refilling device, arranged to allow simultaneous filling of heat carrier to both the first loop and to the second loop.

20. The heat pump device according to claim 2, wherein the heat carrier is freeze resistant down to at least −10° C.

* * * * *